(12) United States Patent
Kimura et al.

(10) Patent No.: US 7,208,695 B2
(45) Date of Patent: Apr. 24, 2007

(54) WELDING SHIELD GAS AND WELDING METHOD

(75) Inventors: Yutaka Kimura, Tokyo (JP); Yuuji Igarashi, Tokyo (JP)

(73) Assignee: Taiyo Nippon Sanso Corporation, Tokyo (JP)

(*) Notice: Subject to any disclaimer, the term of this patent is extended or adjusted under 35 U.S.C. 154(b) by 62 days.

(21) Appl. No.: 10/810,847

(22) Filed: Mar. 29, 2004

(65) Prior Publication Data
US 2004/0188391 A1    Sep. 30, 2004

(30) Foreign Application Priority Data
Mar. 31, 2003    (JP)    ............................. 2003-096770

(51) Int. Cl.
*B23K 9/167* (2006.01)
(52) U.S. Cl. ................................ 219/75; 219/137 WM
(58) Field of Classification Search .................. 219/74, 219/75, 137 WM
See application file for complete search history.

(56) References Cited

U.S. PATENT DOCUMENTS

| | | | | |
|---|---|---|---|---|
| 2,939,942 A | * | 6/1960 | Scheil .......................... | 219/74 |
| 3,066,215 A | * | 11/1962 | Espy ........................... | 219/74 |
| 3,770,932 A | | 11/1973 | Cotter et al. | |
| 4,903,888 A | * | 2/1990 | Clark et al. .............. | 219/76.14 |
| 5,306,358 A | * | 4/1994 | Lai et al. ...................... | 219/74 |
| 5,440,090 A | * | 8/1995 | Davis et al. ........ | 219/137 WM |
| 5,739,503 A | * | 4/1998 | Rouault et al. ..... | 219/137 WM |
| 6,111,219 A | | 8/2000 | Macedo et al. | |
| 6,274,084 B1 | * | 8/2001 | Haudrechy ................... | 420/60 |

FOREIGN PATENT DOCUMENTS

| | | | |
|---|---|---|---|
| DE | 133538 | * | 1/1979 |
| JP | 7-197203 | | 8/1995 |
| JP | 7-299586 | | 11/1995 |
| JP | 2000-197971 A | * | 7/2000 |
| JP | 2001-74712 | | 3/2001 |
| JP | 2002-220618 | | 8/2002 |

OTHER PUBLICATIONS

Lambert, "Cast-to-Cast Variability in Stainless Steel Merchanized GTA Welds", Welding Journal, American Wedding Society, vol. 70, No. 5, May 1, 1991, pp. 41-52; XP000205593.
Du Toit et al, "Nitrogen Control During Autogenous Arc Wedding of Stainless Steel—Part 1: Experimental Observations", Welding Journal, American Wedding Society, vol. 82, No. 8, Aug. 2003, pp. 219-S; XP001177375.
Welding Handbook, vol. 2, 7th edition, 1978, American Welding Society, The Macmillan Press Ltd., p. 132.

* cited by examiner

*Primary Examiner*—Clifford C. Shaw
(74) *Attorney, Agent, or Firm*—Nixon & Vanderhye P.C.

(57) ABSTRACT

A welding shield gas comprising an inert gas and nitrogen gas, where the concentration of the nitrogen gas is 1 to 95 vol %; or comprising an inert gas and a helium gas, where the concentration of the helium gas is 35 to 95 vol %; or comprising an inert gas, nitrogen gas, and a helium gas, wherein the concentration of the nitrogen gas is not less than 1 vol % and less than 65 vol % and the concentration of the helium gas is 35 to 95 vol %. This shield gas can be used in the non-consumable electrode arc welding of a welded material consisting of stainless steel.

11 Claims, 9 Drawing Sheets

A

WELDING SHIELD GAS AND WELDING METHOD

This application claims priority to JP Application No.2003-096770 filed 31 Mar. 2003. The entire contents of this application are incorporated herein by reference.

BACKGROUND OF THE INVENTION

1. Field of the Invention

The present invention relates to a welding shield gas used in welding stainless steel, in particular, austenitic stainless steel, and in particular, to a welding shield gas appropriate for non-consumable electrode arc welding in which the precision of the welding is important, and relates to a welding method using the same.

Priority is claimed on Japanese Patent Application No. 2003-096770, filed Mar. 31, 2003, the content of which is incorporated herein by reference.

2. Description of Related Art

Generally, stainless steel tubing is used as tubing for supplying a gas used in semiconductor fabrication and the like to the fabricating apparatus.

In the welding of tubes, a non-consumable electrode arc welding, for example, I-type butt welding using automatic TIG (tungsten inert gas) welding without using a filler material, is widely used. As a shield gas, a mixed gas consisting of Ar and several percent $H_2$ or pure Ar can be used.

The weld zone of the tube preferably does not have irregularities on the surface thereof. In particular, it is important that at the inner wall surface of the tube at the weld zone, the penetration bead of the weld zone does not form irregularities with respect to the inner wall surface side of the tube, and furthermore, the bead width must fall within a suitable range.

For example, in the I-type butt welding, when the heat input during welding becomes excessive, the amount of melting becomes excessive, and the weld zone considerably widens. In the case of flat position welding, due to the influence of gravity and the like, the bead penetration forms a protrusion with respect to the inner wall surface. In this case, fine metal particles called fume are ejected into the tube, and thereby contamination of the supplied gas due to these particles easily occurs.

In addition, both weld metal having low corrosion resistance and the heat affected zone in the weld zone are present, and thus when the amount of melting is excessive, there is the problem that corrosion occurs over a wide area.

In addition, when heat input into the weld is insufficient, the stability of the arc deteriorates due to consumption of the electrode, or the weld is mispositioned due to human error, the abutted parts are not completely melted up to the inner wall surface of the tube and thus irregularities form due to clearances between the abutted parts of the tubes. In this case, a concavity that forms becomes dead space, and dust particles may accumulate therein. Thus, there is the problem that these accumulated particles are carried along with the supplied gas to cause contamination.

Furthermore, there are the problems that air present in a concavity makes gas exchange difficult and contaminates the supplied gas with impurities.

In addition, when supplied gas is a corrosive gas that is used, for example, in semiconductor fabrication, there are the problems that crevice corrosion in a concavity is exacerbated, the metal corrosion products generated due to the crevice corrosion peel off, and thereby the supplied gas becomes contaminated. Furthermore, due to a concavity, there is the problem that the mechanical strength of the tube deteriorates.

Thus, a method for inspecting the weld zone has been proposed that has as an object confirming whether or not the welding has been properly carried out (refer to Citation 1: Japanese Unexamined Patent Application, First Publication No. 2001-074712).

It is possible to improve the reliability of the tube if the weld zone is inspected, but because the inspection is not a complete solution to this problem, a method that prevents the welding problems themselves is desired.

In addition to insufficient heat input into the weld, the deterioration in the stability of the arc due to consumption of the electrode, or the mispositioning of the weld is due to human error, one factor that hinders the complete melting of the abutted parts is the deterioration of the bead progress caused by slag that forms on the surface of the weld pool during welding.

When the bead progress deteriorates, even if the targeted position of the weld is accurately aligned with the abutted parts, there are cases in which the center position of the bead becomes separated from the abutted parts, and the wall surface in the tubes of the abutted parts are not completely melted.

The deterioration of the bead progress occurs easily when the diameter of the tube is not less than 20 mm and the thickness is not less than 1.2 mm and equal to or less than 3 mm. In addition, when the welding current used is in a low current region of not more than 100A, bead progress deteriorates easily.

It is known that the arc easily becomes unstable when the welding current is low, and to improve the stability of the arc, a pulsed welding method, in which the welding current is periodically set to a high value, is effective. By using pulse welding, the bead progress can be improved to some extent.

However, completely preventing the welding problems by using this method has been difficult.

In addition, when the weld current is pulsed, there is a tendency for the bead face width to become wide in comparison with the penetration bead width, and there are the problems that a weld zone is formed larger than is necessary, the method of setting the welding conditions becomes complicated, and residual defects in the abutted parts that cannot be discovered by visual inspection of the outer surface of the tube occur easily.

As a measure that can be taken against the deterioration of the bead progress, increasing the welding speed and increasing the weld current can be considered. However, when the welding speed and the weld current are increased, the weld penetration deteriorates, easily causing, for example, undercut and an increase in the amount of concavity.

In addition, if the groove shape has a single-V groove or a single-U groove and the root surface height is made as small as possible, residual defects in the abutting parts occur with difficulty. However, in this case, because a costly automatic welding machine that can add a filler material becomes necessary, there is a drawback in terms of cost, and the welding method becomes complicated. In addition, there is the problem that contamination inside the tube occurs easily during the groove preparation due to oil, particles and the like.

Widening the bead width such that the abutted parts can be welded even when progress characteristics deteriorate or using manual welding can also be considered as measures to be taken against bead progress deterioration.

However, there are the problems that widening the bead width invites deterioration in the weld quality and using manual welding requires much labor, which in turn causes a lowering in the welding efficiency.

There is also the possibility that slag generated in the weld pool may contribute to the deterioration in the bead progress. Using a tube consisting of a material having a reduced slag component content can be considered to prevent slag generation (refer, for example, to Japanese Unexamined Patent Applications, First Publication Nos. Hei 7-197203 and 2002-220618).

However, when using a tube consisting of this material, a sufficient effect is not obtained under the welding conditions or tube shape described above.

As described above, completely preventing welding problems is difficult using already existing technology.

In consideration of the problems described above, it is an object of the present invention to provide a welding method that does not cause a deterioration in the welding efficiency and prevents the occurrence of welding problems at low cost when welding stainless steel, and a welding shield gas that can be used with the same.

SUMMARY OF THE INVENTION

The present inventors focused on the composition of the shield gas and the components thereof, and discovered that the bead progress could be improved. The present invention is based on this knowledge.

The welding shield gas of the present invention is a shield gas used in the non-consumable electrode arc welding of a welded material comprising austenitic stainless steel having a Ca concentration not less than 1 wt.ppm, and incorporates an inert gas and nitrogen gas, where the concentration of the nitrogen gas is 1 to 95 vol %.

The welding shield gas of the present invention is a shield gas used in the non-consumable electrode arc welding of a welded material comprising austenitic stainless steel having a Ca concentration of not less than 1 wt.ppm, and incorporates an inert gas and helium gas, where the concentration of the helium gas is 35 to 95 vol %.

The welding shield gas of the present invention is a shield gas used in the non-consumable electrode arc welding of a welded material comprising austenitic stainless steel having a Ca concentration of not less than 1 wt.ppm, and incorporates an inert gas, nitrogen gas, and helium gas, where the concentration of the nitrogen gas is equal to or greater than 1 vol % and less than 65 vol %, and the helium gas concentration is 35 to 95 vol %.

The welding shield gas of the present invention can be used in the case that the welded material has either one or both of an Al concentration that is not less than 10 wt.ppm and a Si concentration that is not less than 0.3 wt. %.

The inert gas is preferably argon.

The welding method of the present invention uses the welding shield gas described above, and a welded material consisting of austenitic stainless steel is welded by using non-consumable electrode arc welding.

The welding method of the present invention can be used for fixed tube welding.

In the welding method of the present invention, a welding shield gas is used that consists of an inert gas-nitrogen mixed gas (a nitrogen concentration of 1 to 98 vol %), an inert gas-helium mixed gas (a helium concentration of 35 to 95 vol %), or an inert gas-nitrogen-helium mixed gas (a nitrogen concentration not less than 1 vol % and less than 65 vol % and helium concentration of 35 to 95 vol %), and thereby the following effects are attained:

(1) It is possible to improve the bead progress easily without using any special equipment or materials. Therefore, it is possible to prevent the occurrence of welding problems without decreasing the welding efficiency and at a low cost.

(2) In the case that nitrogen is included in the mixed gas described above (for example, the inert gas-nitrogen mixed gas), because inexpensive nitrogen gas is used, lowering of the cost becomes possible in comparison to the case of using a shield gas consisting only of an inert gas (for example, argon) or a mixed gas that includes a helium gas.

(3) In fixed tube welding in which the welding position changes during the welding process, it is possible to improve not only the bead progress, but also the penetration shape of the weld zone by using the mixed gas described above. Therefore, it is possible to prevent welding problems.

DETAILED DESCRIPTION OF THE INVENTION

Figure 1:
FIGS. 1 to 10B are photographs showing the test results.

Below, the embodiments of the present invention are explained, but the present invention is not limited by these embodiments.

In the welding method of the present embodiment, a welded material is welded by using non-consumable electrode arc welding. Non-consumable electrode arc welding is an arc welding method in which the electrode is not consumed, and examples thereof are TIG welding and plasma arc welding. In the present embodiment, a welding torch is used that provides an electrode and shield gas supply equipment, and a method can be used in which arc welding is carried out using this electrode while the shield gas from the supply equipment flows towards the welded material.

In the present embodiment, a welding shield gas is used that incorporates an inert gas and a nitrogen gas ($N_2$), where the concentration of the nitrogen gas is 1 to 95 vol %. More preferably, the nitrogen gas concentration is not less than 5 vol %, and more preferably not more than 50 vol %. Specifically, preferably the nitrogen gas concentration is 5 to 50 vol %. When the concentration of the nitrogen gas is less than this range, the effect of increasing the bead progress deteriorates, and when the concentration of the nitrogen gas exceeds this range, defects in crater filling (final treatment) occur easily. In addition, welding cracks occur easily. Furthermore, arc ignition characteristics during the welding start-up deteriorate.

As the inert gas described above, one inert gas selected from among argon, neon, krypton, or helium can be used, or a mixed gas consisting of two or more of these inert gases can be used. Among these, argon is particularly preferable.

In the present embodiment, a welding shield gas can be used that incorporates an inert gas and helium (He), where the concentration of the helium is 35 to 95 vol %. When the concentration of helium gas is below this range, the effect of increasing the bead progress deteriorates. When the concentration of helium exceeds this range, the arc ignition characteristics during welding start-up deteriorate.

As the inert gas described above, one inert gas selected from among argon, neon, or krypton can be used, or a mixed gas consisting of two or more of these inert gases can be used. Among these, argon is particularly preferable.

In the present embodiment, a welding shield gas can be used that incorporates an inert gas, nitrogen gas, and helium gas, where the concentration of the nitrogen gas is not less than 1 vol % and less than 65 vol %, and the concentration of the helium gas is 35 to 95 vol %. The concentration of the nitrogen gas is more preferably not less than 5 vol %, and more preferably 50 vol % or less. When the concentration of the nitrogen gas or the helium gas is less than this range, the effect of increasing the bead progress deteriorates. When the concentration of the nitrogen gas or helium gas exceeds this range, defects in crater filling (final treatment) occur easily. In addition, welding cracks occur easily. Furthermore, arc ignition characteristics during the welding start-up deteriorate.

As the inert gas described above, one inert gas selected from among argon, neon, or krypton can be used, or a mixed gas consisting of two or more of these inert gases can be used. Among these, argon is particularly preferable.

Note that the welding shield gas of the present embodiment can incorporate an inert gas, nitrogen gas, and helium gas, where the combined concentration of the nitrogen and helium is 35 to 95 vol %.

An object of the welding method of the present embodiment is a welded material consisting of stainless steel. In particular, the present invention may be applied to a welded material consisting of austenitic stainless steel.

Austenite stainless steel having a Ca concentration not less than 1 wt.ppm is an example of a welded material. In the case that the Ca concentration of the welded material is within this range, slag that includes Ca is easily generated, and there is a concern that this slag will cause a deterioration in the bead progress. By using the present embodiment, even in the case that the Ca concentration is within this range, the formation of slag can be suppressed, and superior bead progress characteristics can be obtained.

In the welded material consisting of austenitic stainless steel, in the case that the Ca concentration is not less than 1 wt.ppm, and further, one or both of the Al concentration is not less than 10 wt.ppm and the Si concentration is not less than 0.3 wt.ppm, the bead progress characteristics deteriorate easily. If the present embodiment is used, even in the case that these concentrations are in these ranges, the formation of slag can be suppressed, and superior bead progress characteristics can be obtained.

Note that the present embodiment can use austenitic stainless steel in which at least one of the Ca concentration is not less than 1 wt.ppm, the Al concentration is not less than 10 wt.ppm, or the Si concentration is not less than 0.3 wt.ppm.

A tube (tube shaped body), plates, and the like are examples of the forms of the welded material. In particular, the present embodiment is preferably used on tubes.

The welding method of the present embodiment exhibits a remarkable effect when used in fixed tube welding. Fixed tube welding is a method in which welding is carried out by moving a welding torch or the like while the welded material remains stationary when the welded material cannot be moved during welding due to being fixed to another fixed object (a building, another tube, or the like). In fixed tube welding, normally, welding is carried out while the welding torch and the like is rotated with respect to the tube, and the arc is moved in a circumferential direction with respect to the tube (circumferential welding). Fixed tube welding is used in welding of tubes that are fixed to a fixed object (a building or the like) via a tube support or the like, and in welding that uses an automatic welding machine for test piece production or the like in order to set the welding conditions.

In fixed tube welding, it is not possible to arbitrarily choose the welding position, and welding problems easily occur, but it is possible to prevent this by using the present embodiment.

The present embodiment can have as an object a horizontal fixed tubing that is disposed horizontally or a vertical fixed tubing that is disposed vertically. In particular, in a horizontal fixed tube, the penetration shape of the weld zone may easily become unstable because the welding position changes during the welding process, but by using the present embodiment, it is possible to prevent changes in the penetration shape of the weld zone, and it is possible to prevent welding problems.

Note that the welding method of the present embodiment can be applied to rotating tube welding. Rotating tube welding is a method in which the welding torch or the like is not moved, and welding is carried out while rotating the tube in a circumferential direction.

The welding method of the present embodiment exhibits the remarkable effect in the case that it is applied to a welded material having a thickness not more than 3 mm (in particular, not less than 1.2 mm and not more than 3 mm). In the case that the thickness of the welded material is within this range, the arc may become unstable because the welding current is set comparatively low and the bead progress characteristics deteriorate easily, but by using the present embodiment, the bead progress characteristics can be improved even in this case.

In addition, the deterioration of the bead progress characteristics described above occur easily when the tube diameter (outer diameter) is not less than 20 mm, and thus the effects of the present embodiment becomes remarkable in the case that the object is a tube having a tube diameter within this range.

In addition, in the case that the object is a comparatively thin welded material (for example, having a thickness not more than 3 mm), normally a welding method is used in which filler material is not used. In a welding method in which a filler material is not used, the arc may become unstable because the welding current is set comparatively low, and the bead progress characteristics may deteriorate easily. However, by using the present embodiment, bead progress characteristics can be improved even in this case.

The welding current during welding is not particularly limited, but the welding method of the present embodiment exhibits remarkable effects in the case that the welding current is equal to or less than 100A. In the case that the welding current is within this range, the arc may become unstable and the bead progress characteristics deteriorate easily. However, by using the present embodiment, even in the case that the welding current is low, it is possible to improve the bead progress characteristics.

If the welding speed is too slow, the welding efficiency decreases, and if it is too fast, the bead progress characteristics easily deteriorate. Thus, a welding speed of 50 to 150 mm/min (preferably 70 to 120 mm/min) is advantageous.

The welding method of the present embodiment may use a manual welding method by the manual operation of operators, but the present embodiment exhibits a remarkable effect in the case that an automatic welding method is used. The automatic welding method carries out welding while moving the welding torch or the like by using a drive device (motor or the like). In the automatic welding method, it is difficult to correct the welding conditions according to the state of the process of the welding, and correcting this quickly when the bead progress characteristics have deteriorated is not easy. Because the bead progress characteristics are improved by using this embodiment, it is possible to prevent the occurrence of welding problems even when using an automatic welding method.

The welding method of the present invention exhibits remarkable effects in the case that the total amount of Ca in the welded metal, that is, the total amount of Ca included in the welded metal obtained from the welding start-up to the present point in time, is not less than 20 μg (in particular, not less than 30 μg). When the total amount of Ca in the welded metal is within this range, the weld pool may be covered by a slag having Ca as the main component and the bead progress characteristics may deteriorate easily. However, by using the present embodiment, even in the case that the total amount of Ca in the welded metal is within this range, the formation of slag is almost undetectable, and it is possible to obtain superior bead progress characteristics.

In the present embodiment, an inert gas-$N_2$ mixed gas (a $N_2$ concentration of 1 to 95 vol %), an inert gas-He mixed gas (a He of concentration 35 to 95 vol %), or an inert gas-$N_2$—He mixed gas (a $N_2$ of concentration not less than 1 vol % and less than 65 vol %, and a He concentration of 35 to 95 vol %) is used, and thus it is possible to improve the bead progress characteristics easily without using special equipment or materials. Therefore, it is possible to prevent the occurrence of welding problems without lowering the welding efficiency and at a low cost.

While the reason that the bead progress characteristics can be improved in the case that the inert gas-$N_2$ mixed gas, the inert gas-He mixed gas, or the inert gas-$N_2$—He mixed gas are used is not clear, the following points can be inferred as a result of observing the arc in the welding test.

In the case of using a conventional shield gas, the low conductivity slag that includes Ca, Al, Si or the like that is included in the welding material is generated on the weld pool surface, the arc discharge is obstructed because the slag increases as the welding progresses, the arc becomes unstable, and as a result, it is observed that the arc reaches a position significantly separated from the abutted parts, and thereby, the bead progress characteristics deteriorate.

It can be considered that the improvement of the bead progress characteristics due to the mixed gas is because the slag either melts into the welded metal or is released as fume from the welded material due to this mixed gas, and as a result, slag is generated with difficulty, and the arc is stabilized.

In the case that nitrogen is included in the mixed gas described above (for example, the inert gas-nitrogen mixed gas), because inexpensive nitrogen gas is used, lowering the cost becomes possible in comparison to the case of using a shield gas consisting only of an inert gas (for example, argon) or a mixed gas that includes helium.

In addition, in fixed tube welding in which the welding position changes during the welding process, the penetration shape of the weld zone may easily become unstable. However, by using this embodiment, it is possible to improve not only the bead progress, but also the penetration shape of the weld zone by using the mixed gas described above. Therefore, it is possible to prevent welding problems.

TEST EXAMPLES

Test Example 1

Automatic TIG welding was carried out in a circumferential direction without using a filler material on a SUS316L stainless steel tube (nominal external diameter, 89.1 mm; nominal thickness, 2.1 mm).

The Ca concentration in the stainless steel tube used here is 1 wt.ppm, the Al concentration is 20 wt.ppm, and the Si concentration is 0.34 wt.ppm. Rotational tube welding was carried out in which the welding speed was 89 mm/min, the welding current was a constant value (62A), the welding position was flat, and welding was carried out while the welded material was rotated in the circumferential direction. Pure Ar was used as the shield gas.

The external appearance of the weld zone is shown in FIG. 1. This drawing was photographed by spreading the welded pipe into a plate shape. It is understood from FIG. 1 that the bead has had imparted thereto a weaving shape.

Test Example 2

Along with pulsing the welding current, butt welding of the stainless steel tube was carried out at a welding speed of 178 mm/min. The average welding current was 120A. Other conditions were identical to those in Test Example 1.

Like the Test Example 1, pure Ar was used as the shield gas.

Figure 2A:
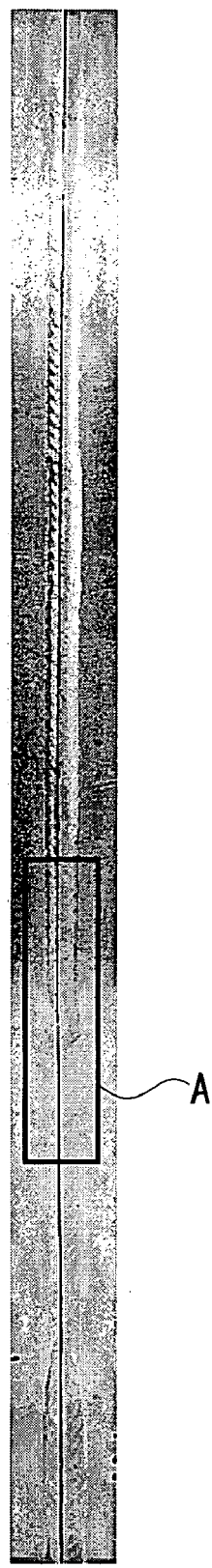
Figure 2B:
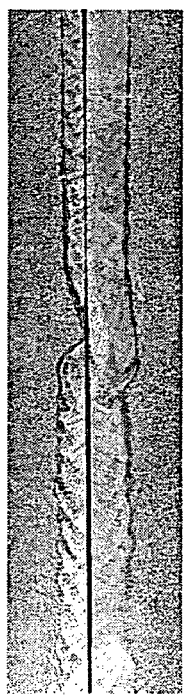
Figure 3:
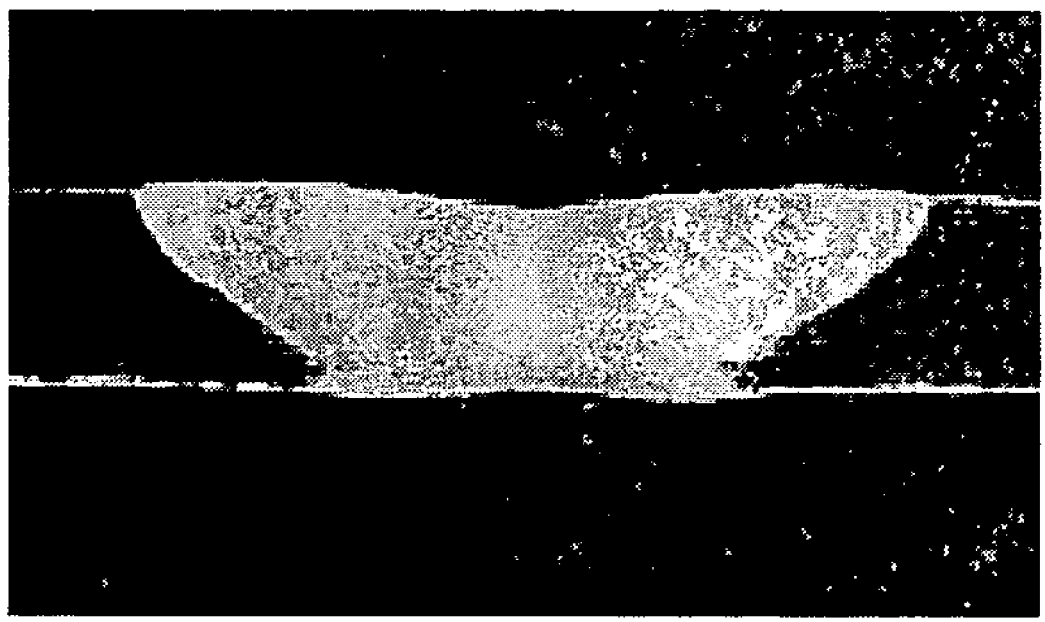

The external appearance of the weld zone is shown in FIG. 2A and FIG. 2B, and a cross section of the weld zone is shown in FIG. 3.

As shown in FIG. 2A, the bead progress was somewhat improved in comparison to Test Example 1. However, as shown by the reference symbol A in FIG. 2B, a part can be recognized at which the abutted parts are not completely fused due to the bead being separated from the abutted parts.

As shown in FIG. 3, in this weld zone, the bead face (upper surface side) width has become extremely wide in comparison with the penetration bead (lower surface side) width, and furthermore and a concavity has formed at the bead center. Thus, the preferable penetration shape has not been attained.

Test Example 3

Like Test Example 1, the welding of a stainless steel tube was carried out at a welding speed of 89 mm/min and a welding current having a constant value (62A). At the completion of the welding, crater filling (final processing) was carried out during which the welding current was gradually decreased. The other conditions were identical to those of Test Example 1.

An Ar—$N_2$ mixed gas was used as the shield gas.

Figure 4:
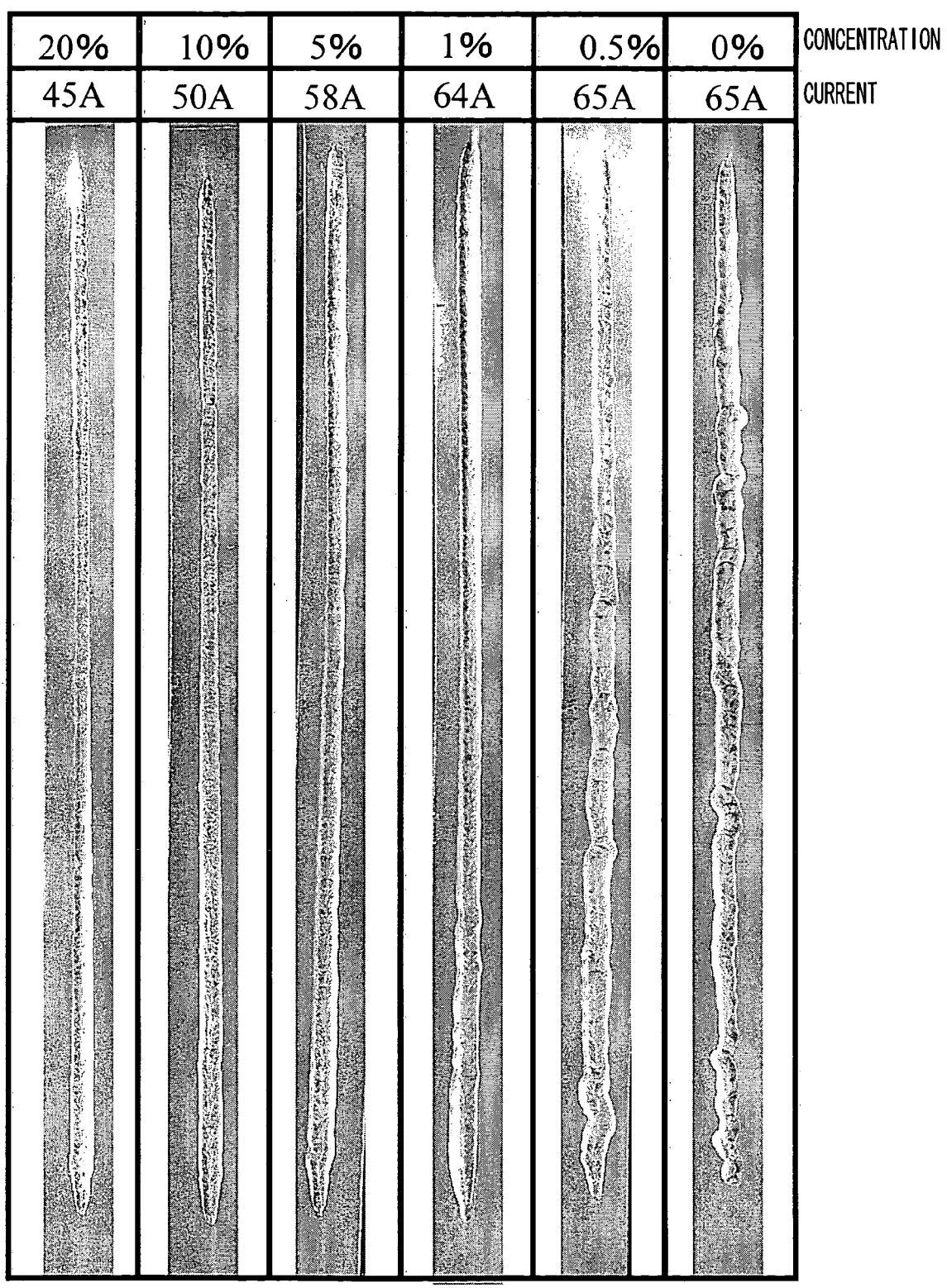

The external appearance of the weld zone is shown in FIG. 4. For comparison, the external appearance of the weld zone for the case that pure Ar (nitrogen gas concentration of 0 vol %) was used as the shield gas is also shown. In the drawing, "concentration" denotes the $N_2$ concentration in the shield gas.

As shown in FIG. 4, in the case that the $N_2$ concentration in the shield gas was 0.5 vol %, like the case in which the nitrogen gas concentration was 0 vol %, weaving of the bead was observed.

In contrast, in the case that the nitrogen concentration was not less than 1 vol % (in particular, not less than 5 vol %), a bead having superior progress characteristics was obtained.

Figure 5:
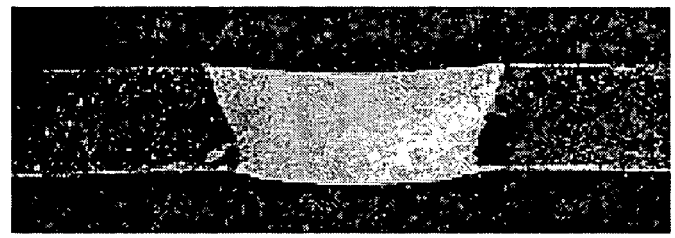

FIG. 5 shows a cross section of the weld zone when the $N_2$ concentration of the shield gas is 50 vol %.

It can be understood from FIG. 5 that the difference between the penetration bead width and the bead face width becomes small, and a preferable penetration shape could be obtained.

Figure 6:
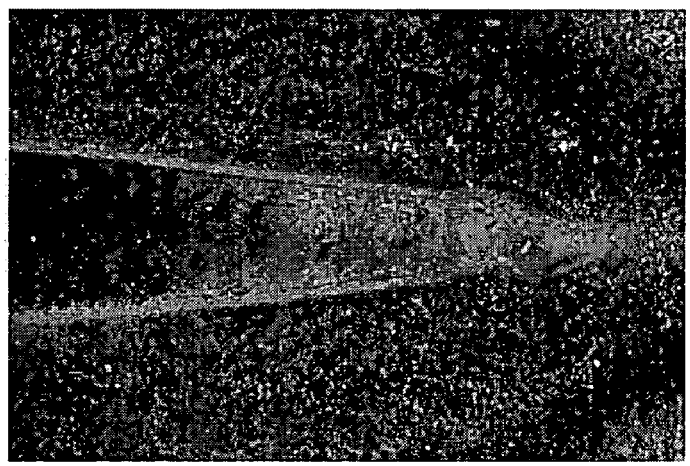
Figure 7:
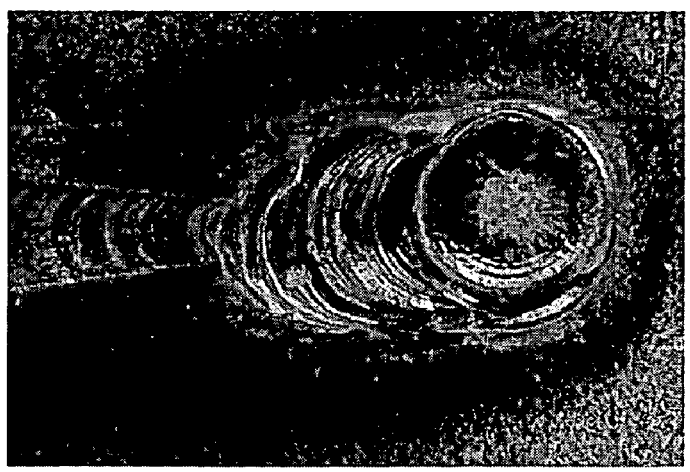

FIG. 6 shows the external appearance of the weld zone at the final welding position when the $N_2$ concentration of the shield gas is 50 vol %, and FIG. 7 shows the external appearance of the weld zone when the $N_2$ concentration of the shield gas is 60 vol %.

It can be understood from FIG. 6 and FIG. 7 that in comparison to the case in which the $N_2$ concentration in the shield gas is 60 vol %, in the case that the $N_2$ concentration is 50 vol %, almost no irregularities are formed in the weld zone, and that advantageous crater filling (final treatment) was possible.

In the case that the $N_2$ concentration in the shield gas was 100 vol %, the arc becomes unstable during welding start-up, and among three tests, the arc failed to ignite in two tests.

In contrast, in the case that the $N_2$ concentration was 95 vol %, the arc advantageously ignited in all three tests.

From these test results, it was understood that in the case in which an Ar—$N_2$ mixed gas having an $N_2$ concentration of 1 to 95 vol % was used as the shield gas, bead progress characteristics could be improved, and furthermore, the arc was advantageously ignited.

In addition, it was understood that when the $N_2$ concentration of the shield gas was not less than 5 vol %, the bead progress characteristics became even more advantageous. In addition, it was understood that when the $N_2$ concentration was not more than 50 vol %, the crater filling (final treatment) could be advantageously carried out.

Test Example 4

Welding was carried out as in Test Example 3, except that a mixed gas consisting of Ar and He was used as the shield gas.

Figure 8:
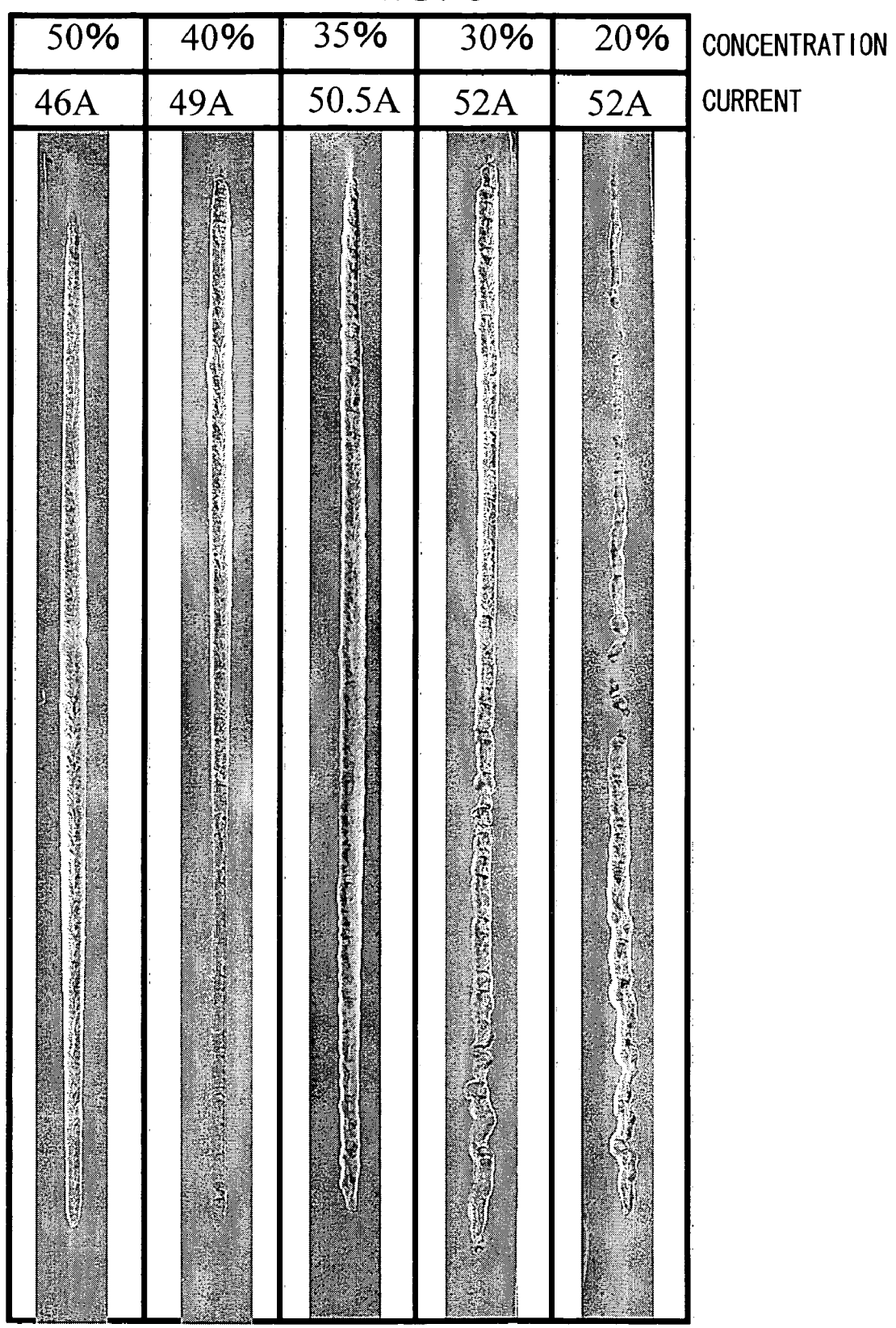

The external appearance of the weld zone is shown in FIG. 8. In the drawing, "concentration" denotes the He concentration in the shield gas.

As shown in FIG. 8, in the case that the He concentration in the shield gas is not more than 30 vol %, weaving of the bead was observed.

In contrast, in the case that the He concentration was not less than 35 vol %, a bead having superior progress characteristics was obtained.

Figure 9:
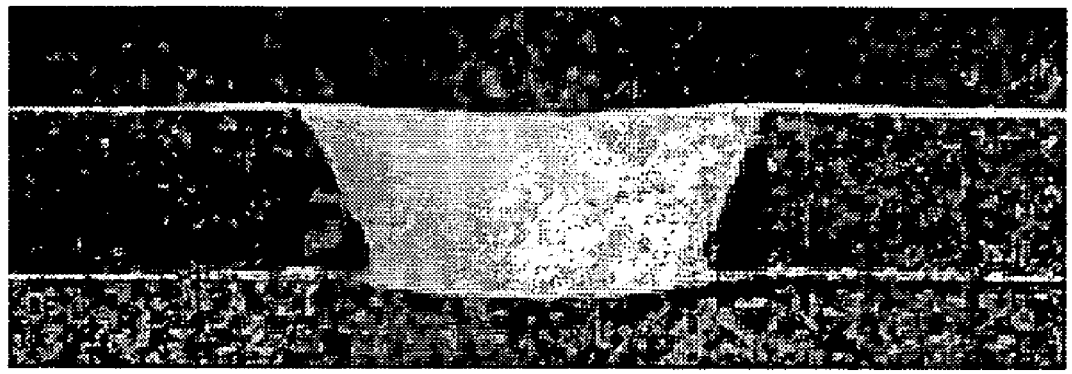

FIG. 9 shows a cross section of the weld zone when the He concentration in the shield gas was 50 vol %.

It can be understood from FIG. 9 that in this weld zone, the difference between the penetration bead width and the bead face width became small, and a preferable penetration shape was obtained.

In the case that the He concentration in the shield gas was 100 vol %, the arc became unstable during the welding start-up, and among three tests, the arc failed to ignite in two tests.

In contrast, in the case that the He concentration is 95 vol %, the arc advantageously ignited in all three tests.

From these test results, it can be understood that in the case in which an Ar—He mixed gas having a He concentration of 35 to 95 vol % is used as the shield gas, it is possible to improve the bead progress characteristics, and furthermore, the ignition of the arc was advantageous.

Test Example 5

Automatic TIG welding was carried out on a stainless steel pipe on the horizontally fixed tube in a circumferential direction.

Pure Ar or an Ar—$N_2$ mixed gas ($N_2$ concentration of 50 vol %) was used as the shield gas. The welding current has the same conditions for one rotation around the tube. The other conditions were identical to those in Test Example 1.

In the horizontal fixed tube welding, because the welding position changes during the process of the welding, the position of the slag in the weld pool also changes, and the arc becomes unstable easily.

Figure 10A:

Due to this, in the case that the Ar is used in the shield gas, the bead width did not stabilize and the penetration was locally insufficient under conditions in which the welding current were identical for one rotation around the tube (refer to FIG. 10A).

Figure 10B:

In contrast, in the case that an Ar—$N_2$ mixed gas was used, the bead width is almost completely constant, and the stability of the penetration was superior (refer to FIG. 10B).

From these figures, it can be understood that in the case that an Ar—$N_2$ mixed gas was used, even under simple conditions in which the welding current is identical for one rotation around the tube (constant over the entire welding process), superior results were obtained with respect to the progress characteristics of the bead and the penetration shape and the like.

Test Example 6

Welding is carried out on SUS316L stainless steel tube (welded material) having an outer diameter of 60.5 mm and a thickness of 1.65 mm using Ar as a shield gas. The other conditions are identical to those of Test Example 1.

Table 1 shows the results of analyzing the components of the welded material and the slag components observed on the welded metal surface. The Ca, Al, and Si concentrations in the base metal (welded material) are extremely low, while in contrast, these components are extremely concentrated in the slag in large amounts. The concentrations of each of the elements in comparison to the base metal are: Ca, 42,000 times; Al, 850 times; and Si, 40 times.

In particular, no matter how low the content of the Ca, which is strongly oxidizing, in the base metal, it is the cause of slag formation, and thus has a detrimental effect on the welding characteristics.

TABLE 1

|  | Fe | Cr | Ni | Mo | Ca | Si | Al |
| --- | --- | --- | --- | --- | --- | --- | --- |
| WELDED MATERIAL | Bal. | 16.66 | 12.62 | 2.15 | 0.0005 | 0.37 | 0.003 |
| SLAG | 37.4 | 16.21 | 11.55 | 3.00 | 20.69 | 15.07 | 2.55 |

(unit: wt. %)

Figure 11:
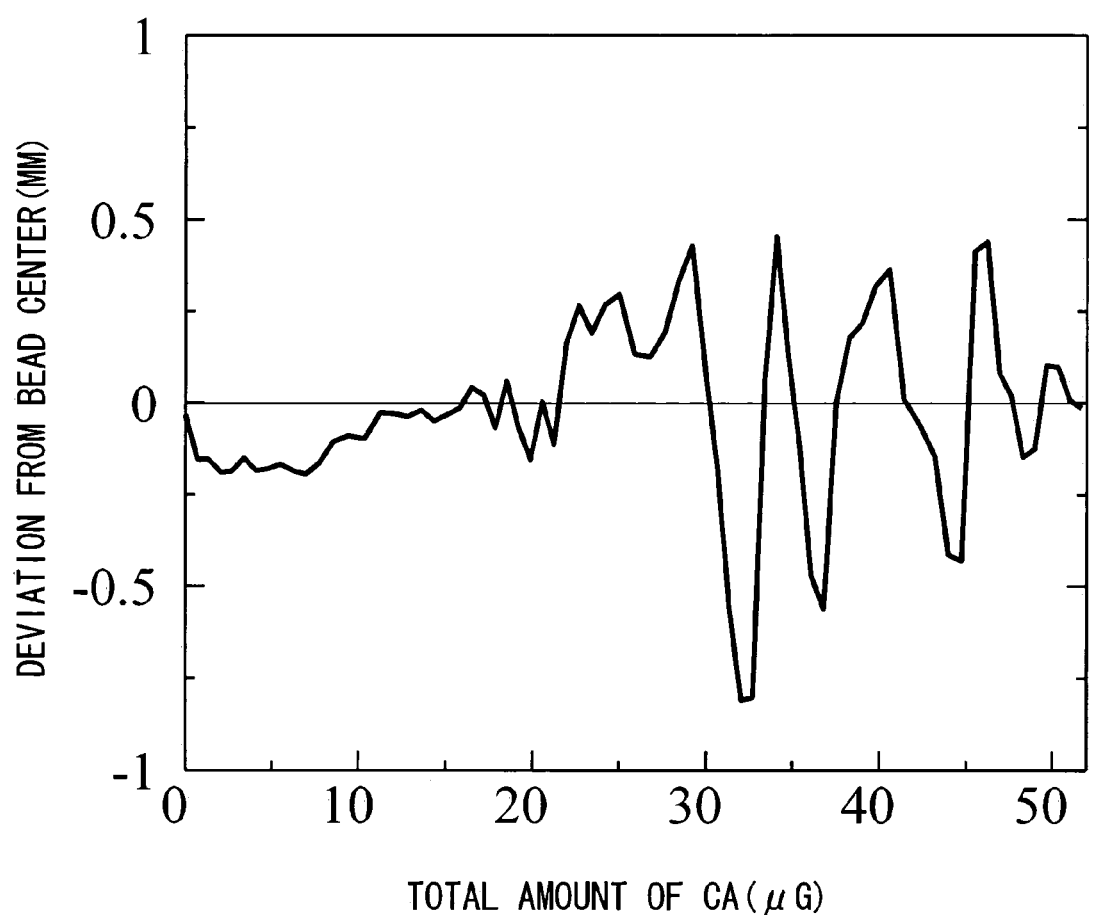
FIG. 11 is a graph showing the test results.

FIG. 11 shows the results of investigating over the entire welding process the amount of deviation at the bead center from the abutted parts (the amount of deviation in the axial direction of the tube) for one rotation around the tube. The abscissa shows the total amount of Ca in the welded metal, that is, the total amount of welded metal obtained from the welding start-up to the present point in time multiplied by the Ca concentration in this stainless steel tube. The ordinate shows the amount of the deviation in the tube axis direction of the center of the bead with respect to the abutted parts.

The amount of deviation has a positive value in the case that the deviation is in the direction of the tube axis and negative in other directions.

As shown in FIG. 11, it can be understood that in the case that the total amount of the Ca in the welded metal is not less than 20 μg (in particular, not less than 30 μg), the deviation of the bead becomes large.

In contrast, in the case that welding tests are carried out using an Ar—$N_2$ mixed gas ($N_2$ concentration of 1 to 95 vol %), an Ar—He mixed gas (He concentration of 35 to 95 vol %), or an Ar—$N_2$—He mixed gas ($N_2$ concentration not less than 1 vol % less than 65 vol %; He concentration of 35 to 95 vol %), almost no bead deviation can be discerned.

From results of the welding tests having as an object a plurality of welding materials having differing Ca, Al, and Si concentrations respectively, it can be understood that the minimum values of the range of the concentration of Ca, Al, and Si for which the welding method of the present Test Examples is effective in terms of bead progress and the like, are respectively 1 wt.ppm, 10 wt.ppm, and 0.3 wt.ppm.

Based on these test results, it can be understood that when the concentrations of each of the components described above in the welding material are in the range shown below, the welding method using the shield gases described above has a remarkable effect in terms of the bead progress and the like.

$$0.42 \leq 1000 \times \text{Ca concentration} + 20 \times \text{Al concentration} + \text{Si concentration}$$

(where all units of concentration are wt. %)

Furthermore, based on these test results, it can be understood that when the concentrations of each of the components described above in the welding material are in the range shown below, the welding method using the shield gases described above has even more remarkable effects in terms of the bead progress and the like.

$$0.90 \leq 1000 \times \text{Ca concentration} + 20 \times \text{Al concentration} + \text{Si concentration}$$

(where all units of concentration are wt. %)

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A welding method for non-consumable electrode arc welding of welded material, the welded material comprising austenitic stainless steel having a Ca concentration not less than 1 wt. ppm, and the welding method comprising:
    a step of using a welding shield gas consisting of an inert gas and nitrogen gas, the concentration of the nitrogen gas being 5 to 95 vol %.

2. A welding method according to claim 1, wherein the inert gas is argon gas.

3. A welding method according to claim 1, wherein the welding material is a fixed tube, and further comprising a step of welding the welded material while it remains stationary while moving a welding torch.

4. A welding method according to claim 1, the welded material comprising: at least one of Al at a concentration not less than 10 wt. ppm, and Si at a concentration not less than 0.3 wt. ppm.

5. A welding method according to claim 1, wherein the welding material has a thickness not more than 3 mm.

6. A welding method according to claim 1, wherein a welding current is equal to or less than 100A.

7. A welding method according to claim 1, wherein a welding speed is 50 to 150 mm/min.

8. A welding method according to claim 1, wherein concentrations of each of Ca, Al, and Si in the welding material are in a range of:
    $0.42 \leq 1000 \times$ Ca concentration (wt. %)+$20 \times$ Al concentration (wt. %)+Si concentration (wt. %).

9. A welding method according to claim 1, wherein concentrations of each of Ca, Al, and Si in the welding material are in a range of: $0.90 \leq 1000 \times$ Ca concentration (wt. %)+$20 \times$ Al concentration (wt. %)+Si concentration (wt. %).

10. A welding method for non-consumable electrode arc welding of a welding material comprising austenitic stainless steel, the welding method comprising welding a material comprising austenitic stainless steel using a welding shield gas comprising an inert gas, nitrogen gas, and helium gas, wherein the concentration of the nitrogen gas is not less than 1 vol % and less than 65 vol %, and the concentration of the helium gas is 35 to 95 vol %.

11. A welding method according to claim 10, wherein a combined concentration of the nitrogen and helium is 35 to 95 vol %.

* * * * *